(12) United States Patent
Van Wingerden

(10) Patent No.: US 6,665,982 B1
(45) Date of Patent: Dec. 23, 2003

(54) FLORAL BOUQUET BAG

(75) Inventor: Case J. Van Wingerden, Carpinteria, CA (US)

(73) Assignee: Westland Floral Company, Carpenteria, CA (US)

( * ) Notice: Subject to any disclaimer, the term of this patent is extended or adjusted under 35 U.S.C. 154(b) by 0 days.

(21) Appl. No.: 10/165,849

(22) Filed: Jun. 6, 2002

(51) Int. Cl.[7] ................................................. A01G 9/02
(52) U.S. Cl. ..................... 47/72; 47/41.01; 47/65.7; 47/65.8; 206/423
(58) Field of Search ........................... 47/41.01, 72, 82, 47/65.8, 65.7; 206/423

(56) References Cited

U.S. PATENT DOCUMENTS

| | | | |
|---|---|---|---|
| 3,748,781 A | | 7/1973 | Erling |
| 3,949,873 A | * | 4/1976 | Platt ........................... 206/311 |
| 4,091,925 A | | 5/1978 | Griffo et al. |
| 4,109,442 A | * | 8/1978 | Maasback ....................... 53/29 |
| D259,333 S | * | 5/1981 | Charbonneau ............... D9/306 |
| 4,946,290 A | * | 8/1990 | Matyja ......................... 383/10 |
| 5,235,782 A | * | 8/1993 | Landau ........................... 47/72 |
| 5,443,670 A | * | 8/1995 | Landau ....................... 156/191 |
| D363,896 S | * | 11/1995 | Bergmann ................. D11/148 |
| 5,497,881 A | * | 3/1996 | Weder ......................... 206/423 |
| 5,509,251 A | * | 4/1996 | Weder et al. .................. 53/399 |
| 5,595,045 A | | 1/1997 | Weder et al. |
| 5,655,353 A | * | 8/1997 | Weder et al. .................. 53/397 |
| 5,974,730 A | | 11/1999 | Chien |
| 5,996,313 A | | 12/1999 | Weder |
| 6,115,962 A | * | 9/2000 | Weder et al. ................... 47/72 |
| 6,125,578 A | | 10/2000 | Weder |
| 6,129,208 A | * | 10/2000 | Ferguson ..................... 206/423 |
| 6,129,209 A | * | 10/2000 | Tchira ......................... 206/423 |
| 6,151,829 A | * | 11/2000 | Weder ......................... 47/58.1 |
| 6,295,758 B1 | | 10/2001 | Weder et al. |
| 6,385,905 B1 | * | 5/2002 | Weder ........................... 47/72 |
| 6,415,546 B2 | * | 7/2002 | Weder et al. ............... 47/41.01 |
| 2001/0007183 A1 | | 7/2001 | Weder |
| 2001/0045058 A1 | | 11/2001 | Weder et al. |

FOREIGN PATENT DOCUMENTS

| | | | | |
|---|---|---|---|---|
| FR | 2205264 A | * | 11/1972 | ........... A01G/5/00 |
| FR | 2286759 | * | 10/1974 | ........... B65D/33/00 |
| GB | 2056410 A | * | 3/1981 | ........... B65D/30/28 |
| GB | 2074542 A | * | 4/1981 | ........... B65D/30/10 |
| JP | 408058866 A | * | 3/1994 | ........... B65D/85/52 |
| WO | WO 97/12819 | * | 4/1997 | ........... B65D/85/50 |

* cited by examiner

*Primary Examiner*—Peter M. Poon
*Assistant Examiner*—Andrea Valenti
(74) *Attorney, Agent, or Firm*—Knobbe, Martens, Olson & Bear, LLP (57) ABSTRACT

A bag sleeve that provides a protective packaging for a floral bouquet contained therein while providing a convenient way to pick-up and carry the bouquet. The bag sleeve has a shield portion defining a bouquet receiving space that can be made of a rigid paper layer and a water-resistant layer attached to the paper layer. At least one handle can be attached to a blossom end of the shield portion. In one embodiment, a water-resistant base portion extends from a stem end of the shield portion, wherein the base portion has an opening which permits stems of the floral bouquet to protrude from the bag sleeve. In another embodiment, the bag sleeve comprises at least two panels configured to form v-grip backbones along a lateral edges of the bag sleeve.

55 Claims, 8 Drawing Sheets

FLORAL BOUQUET BAG

BACKGROUND OF THE INVENTION

1. Field of the Invention

The invention relates to a protective shield for a floral bouquet, and more particularly, to an improved apparatus and method for transporting and displaying the floral bouquet.

2. Description of the Related Art

When a bouquet of cut flowers is purchased at a floral shop or stand, the form in which they are usually presented to the purchaser by the seller is with an over-wrap of foil or cellophane, with the stem portion fastened with a staple or tied with elastics, rubber bands, twist ties, ribbon or the like. Sometimes a peak at the flared top end of the wrap is folded over the flower heads and also secured in place, e.g. by tucking or stapling.

There are clearly some advantages to this manner of presentation, ones which no doubt have contributed to its prevalence. It is inexpensive, the wrapping material is easy to obtain and to store, and sometimes the bouquets can be wrapped ahead of time and the wrap tips kept immersed in water so that the time needed to execute a sale and delivery is kept to a minimum.

However, there also are drawbacks to this manner of presentation. The bouquets often must be wrapped at the place of sale because foil and cellophane do a poor job of protecting the bouquets from being crushed during transport to the place of sale. It also can be difficult to remove an individual bouquet from a display container containing multiple bouquets, often requiring the purchaser to reach down to the bottom of the bouquet to find a place to conveniently grasp the bouquet. This exposes the person to personal injury from thorns protruding from the flower stems and to slimy growth on the leaves and in the water. Also, the person also may get his or her hands wet reaching down into the display container. Additionally, there is a tendency for the bouquet to fall out of the wrapping unless the bouquet is maintained in an upright condition. The bouquet also tend to separate within the wrap unless the wrap is wrapped tightly enough. This, however, tends to damage the flowers and limits the display desirability. No doubt these and other drawbacks are evident to those having frequent occasion to use such means for wrapping and carrying bouquets.

SUMMARY OF THE INVENTION

One embodiment of the invention is a bag sleeve for protecting a floral bouquet while transporting or carrying the floral bouquet. The bag sleeve includes a shield portion defining a bouquet receiving space, wherein said shield portion has a blossom end and a stem end, at least one handle attached to the blossom end of the shield portion, and a water-resistant base portion extending from the stem end of the shield portion, wherein the base portion has an opening therein permitting stems of the floral bouquet to protrude from the bag sleeve. In one embodiment, the shield portion is made of two dissimilar layers: a paper layer, and a water-resistant layer.

In another embodiment, the invention is a bag sleeve for protecting a floral bouquet while transporting or carrying the floral bouquet. The bag sleeve includes a shield portion defining a bouquet receiving space, wherein the shield portion has a blossom end and a stem end, wherein said shield portion has a first opening in the blossom end and a second opening in the stem end permitting stems from the floral bouquet to protrude from the bag sleeve, and where the shield portion comprises a rigid paper layer and a water-resistant layer attached to said paper layer. The bag sleeve also includes at least one handle attached to the blossom end of the shield portion. In one embodiment, the shield portion exhibits selfexpanding properties.

In another embodiment, the invention is a method of displaying a floral bouquet in a protective bag sleeve. The method includes inserting a floral bouquet into a bag sleeve having an upper blossom portion and a lower stem portion, such that at least one stem of the floral bouquet protrudes from a water-resistant base portion in the stem portion of the bag sleeve, securing the floral bouquet in the bag sleeve by wrapping a member around the water-resistant base portion with the stem protruding therefrom, and displaying handles attached to the bag sleeve such that the handles extend above the upper blossom portion of the bag sleeve.

In another embodiment, the invention is a method of carrying a floral bouquet in a protective bag sleeve. The method includes inserting a floral bouquet into a bag sleeve having an upper blossom portion and a lower stem portion, such that at least one stem of the floral bouquet protrudes from a water-resistant base portion in the stem portion of the bag shield, securing the floral bouquet in the bag sleeve by wrapping a member around the water-resistant base portion with the at least one stem protruding therefrom, and carrying the bag sleeve with handles attached to the blossom portion such that the handles extend above the upper blossom portion of the bag sleeve.

BRIEF DESCRIPTION OF THE DRAWINGS

These and other objects and features of the invention will become more fully apparent from the following description and appended claims taken in conjunction with the following drawings, where like reference numbers indicate identical or functionally similar elements.

DETAILED DESCRIPTION OF THE INVENTION

A detailed description of an embodiment of the invention is provided below. While the invention is described in conjunction with that embodiment, it should be understood that the invention is not limited to any one embodiment. On the contrary, the scope of the invention is limited only by the appended claims, and the invention encompasses numerous alternatives, modifications and equivalents. For the purpose of example, numerous specific details are set forth in the following description in order to provide a thorough understanding of the invention. The invention may be practiced according to the claims without some or all of these specific details.

Figure 1:
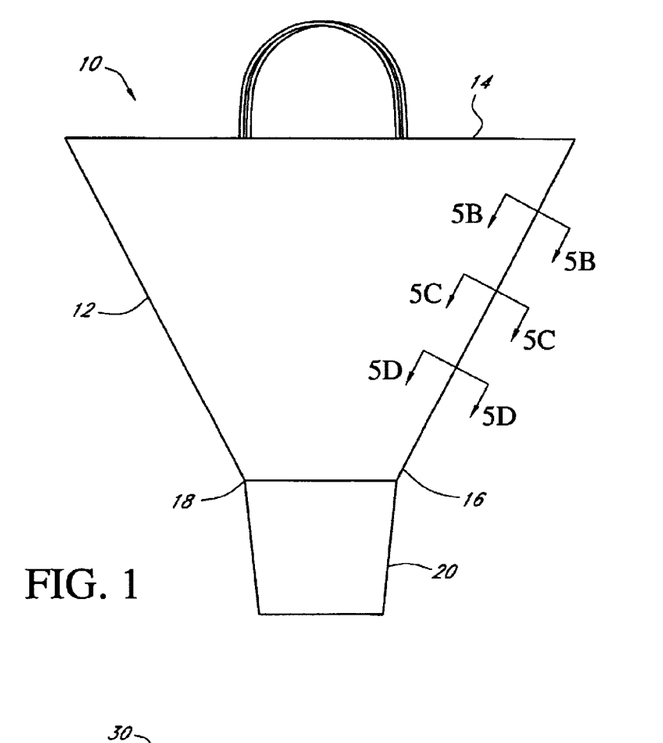
FIG. 1 is a plan view of a bag sleeve according to one embodiment of the invention.

Shown in FIG. 1 and designated therein by the general reference numeral 10 is a bag sleeve for a floral bouquet. The bag sleeve 10 provides a natural floral display configuration that securely cradles and protects flowers during transportation while providing a convenient way to pick-up and carry the product. In one embodiment, the bag sleeve 10 has a shield portion 12 having a first end 14 and a second end 16. As shown, the shield portion 12 is generally an inverted triangle shape with a single truncated tip 18 at the second end 16, however other shapes such as geometric, non-geometric, asymmetrical and/or fanciful shapes may be utilized. This inverted triangle shape distributes the weight of a floral bouquet and the lifting forces when transporting the floral bouquet and also effectively supports the floral bouquet when secured as described below. A base portion 20 extends from the second end 16.

Figure 2:
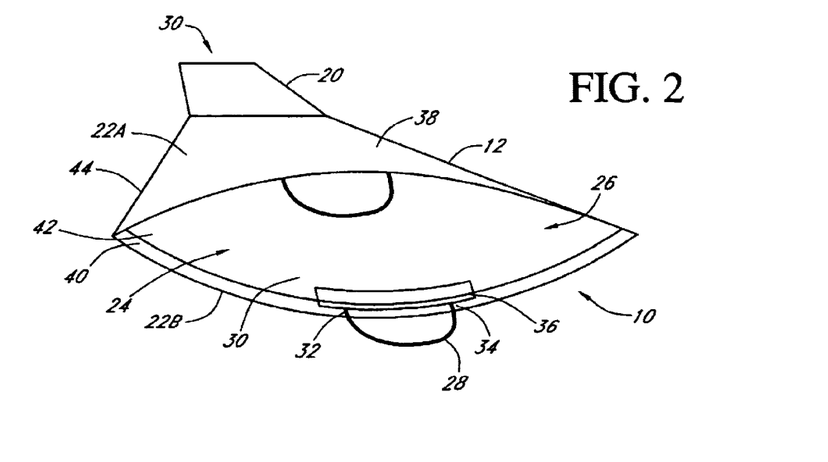
FIG. 2 is a perspective view illustrating a receiving space in a shield portion of the bag sleeve of FIG. 1.

FIG. 2 illustrates that the shield portion 12 has at least one side panel 22. Preferably, the shield portion 12 has two side panels 22 that are substantially the same size and shape, such that when the shield portion 12 is devoid of a floral bouquet, the shield portion 12 lays flat in a conveniently storable configuration. As shown by way of example but not by way of limitation, when the side panels 22 are expanded outward, the shield portion 12 forms a generally conical shape such that an opening 24 leads to a retaining space 26 inside the shield portion 12. The retaining space 26 projects through the shield portion 12 and through the base portion to a stem opening 30 in the base portion 20. However, the shield portion 12 may be cylindrical or any other shape capable of receiving a floral bouquet (not shown) therein. The floral bouquet may be disposed in the opening 24 in the shield portion 12 and contained substantially in the receiving space 26 of the shield portion 12, as will be described in detail below. Floral bouquet as used herein means cut fresh flowers, artificial flowers, a single flower or other fresh and/or artificial plants or other floral materials and may include other secondary plants and/or ornamentation or artificial or natural materials which add to the aesthetics of the overall floral arrangement. The floral bouquet can have a bloom or foliage portion and a stem portion.

Figure 3:
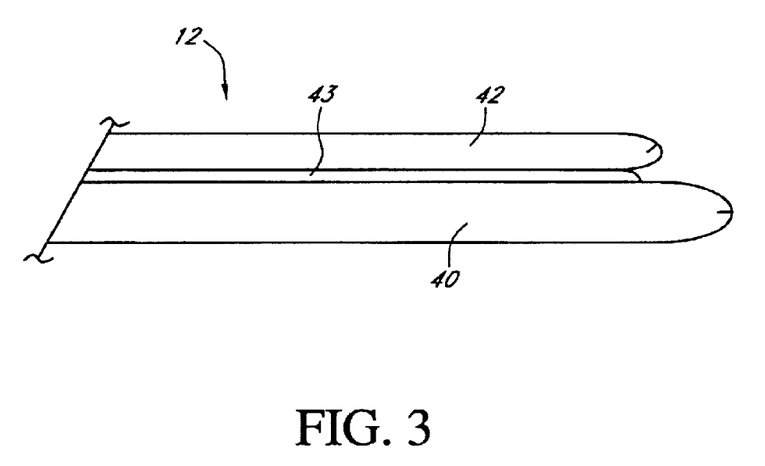
FIG. 3 is a sectional view of the shield portion taken along line 3—3 of FIG. 1 of an embodiment of the bag sleeve.

FIG. 3 is a cross-section of one embodiment illustrating that the shield portion 12 has a paper layer 40 to provide strength and protective durability, and a water-resistant layer 42, such as a polypropylene film. The paper layer 40 and the water-resistant layer are bonded together with a bonding agent 43 as is known in the art. Alternately, the paper layer 40 and the water-resistant layer can be attached with a tape. The paper layer 40 can be a craft paper (untreated or treated in any manner), fabric (woven or nonwoven or synthetic or natural), cloth, fiber, burlap, or combinations thereof. It will be appreciated that the shield portion 12 has sufficient flexibility but also sufficient rigidity to both remain in and sustain its general shape, thereby substantially surrounding and encompassing the floral bouquet. Thus, when the paper layer 40 is flexed by pushing the side panels 22 outward to receive the floral bouquet, the paper layer 40 forms a shell-like covering around the floral bouquet. The paper layer 40 has a paper weight in a range from about 75 grams to about 200 grams. Often, the weight of the paper layer 40 is in a range from about 120 grams to about 150 grams. In one embodiment, the paper layer 40 is a natural craft paper having a weight of 120 grams. In one embodiment, the paper layer 40 is a natural craft paper having a weight of 150 grams. The paper layer 40 may vary in color and may consist of designs or decorative patterns which are printed, etched, and/or embossed thereon using inks or other printing materials.

The water-resistant layer 42 can be cellophane, foil, polycarbonate, polymer film or the like. In one embodiment, the water resistant layer 42 is polypropylene. Preferably, the water-resistant layer 42 resists tearing or puncturing. The tensile strength of the polypropylene water-resistant layer 42 is fortified when bonded with the paper layer 40 to create a protective shell around a floral bouquet. The paper layer 40 and water-resistant layer 42 of the shield portion 12 may be connected together with an adhesive. Alternately, the water-resistant layer 42 can be bonded or laminated onto the paper layer 40 using methods known in the art. Additionally, an insulating material (not shown) such as bubble film can be utilized in order to provide additional protection for the floral bouquet contained therein.

In one embodiment, the base portion 20 is made from the same material as the water-resistant layer 42 of the shield portion 12. In one embodiment, the base portion 20 is fastened to the shield portion 12 with a suitable bonding material such as any bonding material described herein. In another embodiment, the base portion 20 is an extension of the water-resistant layer 42 of the shield portion 12, such that they are formed as a unitary component.

Figure 4:
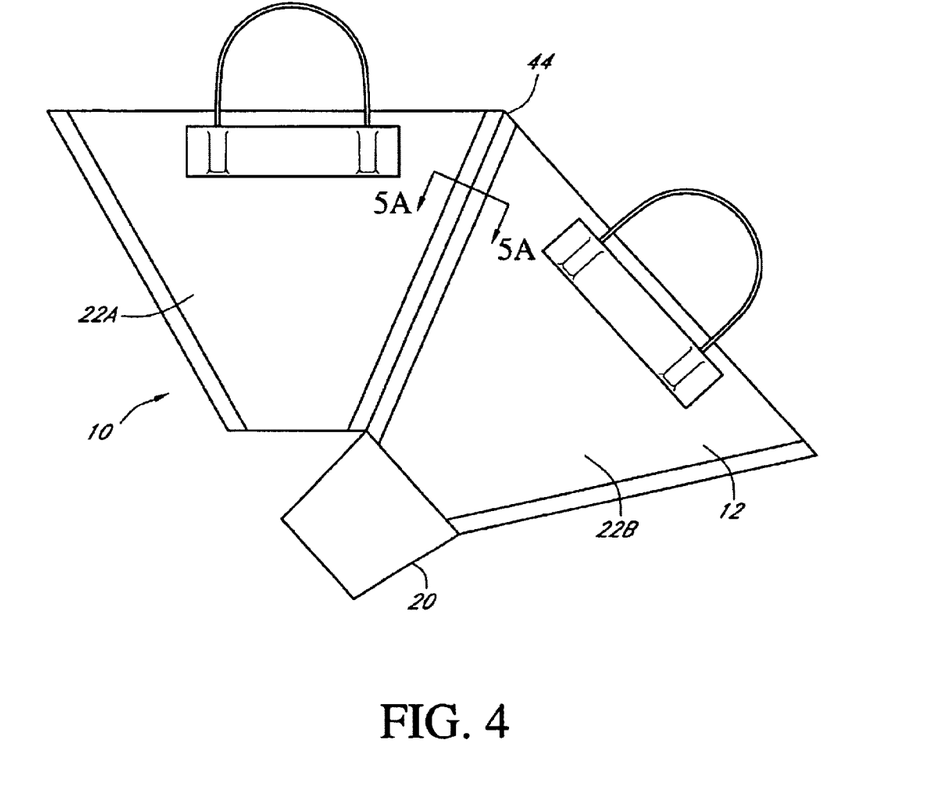
FIG. 4 is a plan view of the bag sleeve of FIG. 1 illustrating a seam thereof.

FIG. 4 illustrates that a carrying handle 28 is attached to an inner surface 30 of each side panel 22A and 22B of the shield portion 12. In one embodiment, the handle 28 is a twisted paper cord bent substantially into a half round configuration. Preferably, the twisted paper cord is treated to prevent water penetration. Twisting the paper cord strengthens the tensile lateral pulling strength and provides for firm comfortable grip when used under normal circumstances. Other materials, such as string, rope, ribbon, paper strips and the like can also be used for the handle 28. A first end 32 and a second end 34 of the handle 28 are secured to the side panel 22 to form an arched hand placement zone. The first and second ends 32 and 34 of the handle 28 are fastened to the side panel 22 with a bonding material. In one embodiment, the bonding material is an adhesive, preferably a water-resistant adhesive. The bonding material also can be a heat sealable material, a pressure sensitive adhesive, or an adhesive tape, such as a two-sided sticky tape or a single-sided sticky tape.

In one embodiment the first and second ends 32 and 34 are sandwiched between an inner bonding strip (not shown) and an outer bonding strip 36. The handle 28 is attached to the bag sleeve 10 by fastening the inner bonding strip to the side panel 22. The bonding strips 36 disperse the forces created by the weight of the floral bouquet throughout the side panel 22 when lifting or transporting the floral bouquet with the handles 28 of the bag sleeve 10. The bonding strips 36 are fastened to the inner surface 30 of the side panel 22. One skilled in the art will understand that the handles 28 can also be fastened to an outer surface 38 of bag sleeve 10 or that the handles 28 may be formed as an integral part of the side panels 22. Additionally, it is conceived that only a single handle 28 is attached to the shield portion 12.

The shield portion 12 is constructed from any suitable material that is capable of being formed into a shield having a retaining space 26 capable of being formed into a bag sleeve 10 and receiving as well as surrounding and encompassing a floral bouquet as described herein. The shield portion 12 may be constructed of a single layer of material or a plurality of layers of the same or different types of materials.

FIGS. 4 and 5A–D illustrate that during manufacture of the bag sleeve 10, the side panels 22A and 22B having the bonded paper layer and the water-resistant layer are attached at a backbone seam 44. Various embodiments of the backbone seam 44 are contemplated in the invention. In one embodiment, shown in an open state in FIG. 5A and a folded state in FIG. 5B, edges 46 overlap and are fastened together with a bonding agent 48 such as any adhesive described herein. The overlap region is creased to form a V-grip backbone four-ply seam 44. Preferably, the edges overlap by approximately one to two inches. The construction of the shield portion 12 is reinforced by the strength and resilience of the backbone seams 44. The seam 44 provides two backbones of flexible reinforcement and durability upon bonding.

Figure 5A:
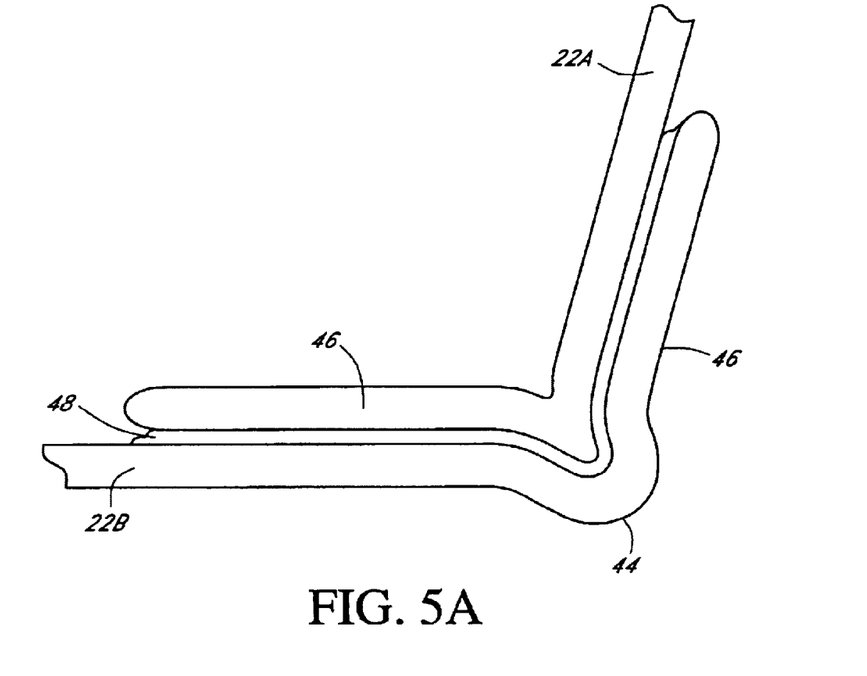
FIG. 5A is a sectional view of the seam taken along line 5A—5A of FIG. 4 of an embodiment of the bag sleeve.
Figure 5B:
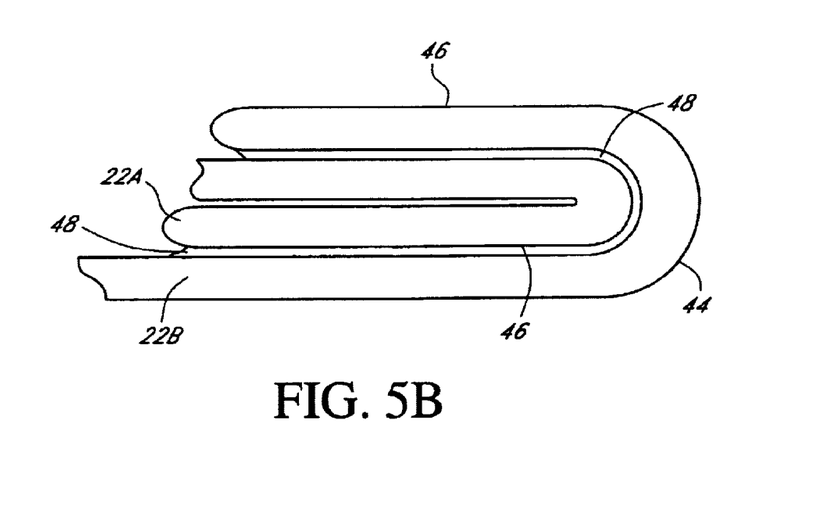
FIG. 5B is a sectional view of the seam taken along line 5B—5B of FIG. 1 of an embodiment of the bag sleeve.
Figure 5C:
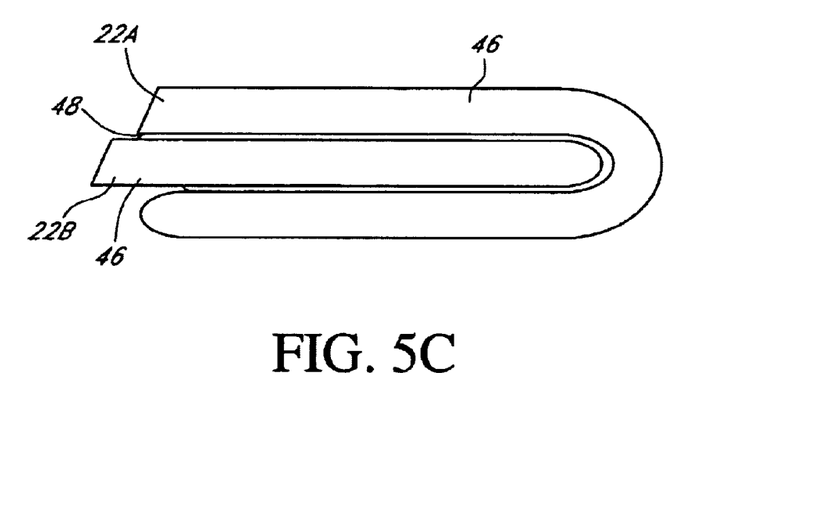
FIG. 5C is a sectional view of the seam taken along line 5C—5C of FIG. 1 of an embodiment of the bag sleeve.
Figure 5D:
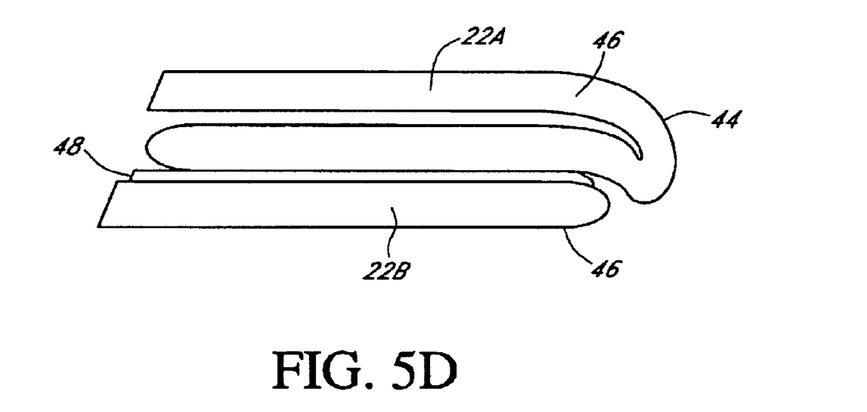
FIG. 5D is a sectional view of the seam taken along line 5D—5D of FIG. 1 of an embodiment of the bag sleeve.

In another embodiment, shown in FIG. 5C, the edge 46 of side panel 22A is folded about the edge 46 of side panel 22B to form a flat folded backbone seam 44. The edges 46 are fastened together with a bonding agent 48 such as any adhesive described herein. In an alternate embodiment shown in FIG. 5D, an edge 46 of side panel 22A is doubled over to form a backbone. The folded edge 46 is then attached with the bonding agent 48 to the edge 46 of side panel 22B to form a backbone seam 44. Of course, those skilled in the art can conceive of other methods of attaching the edges of the side panels and for sealing the seam, such as heat sealing.

As can be seen, when the side panels 22 are expanded outward, the diameter of the opening 24 (FIG. 2) in the shield portion 12 adapts or enlarges to fit the varying amounts of flowers that are to be displayed or transported within the bag sleeve 10. This expanding motion also pulls the seams 44 inward against the bias of the paper layer 40 which bow outward, providing firm protective support for the floral bouquet contained therein.

Figure 6:
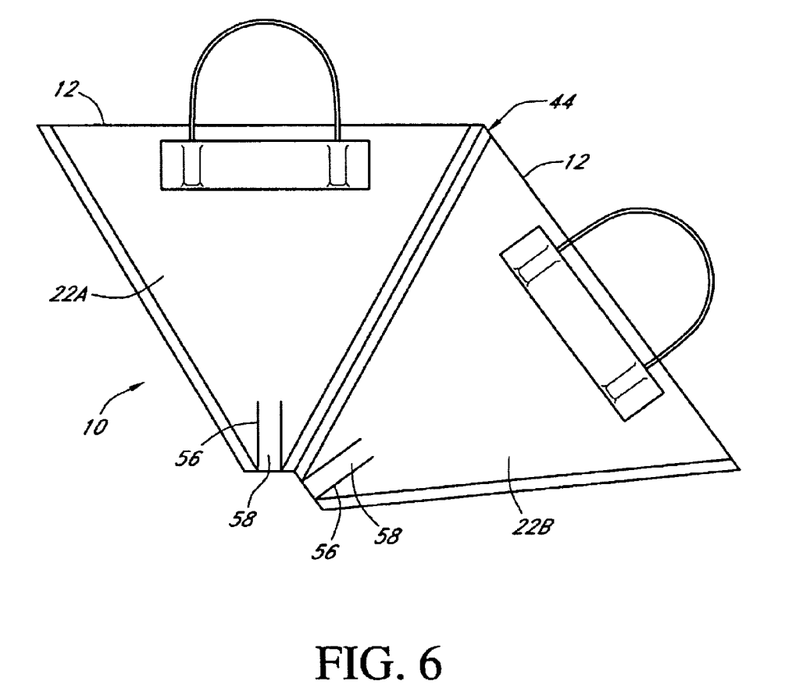
FIG. 6 is plan view of another embodiment of the bag sleeve of FIG. 1 illustrating slits cut in one tip of the bag sleeve.
Figure 7:
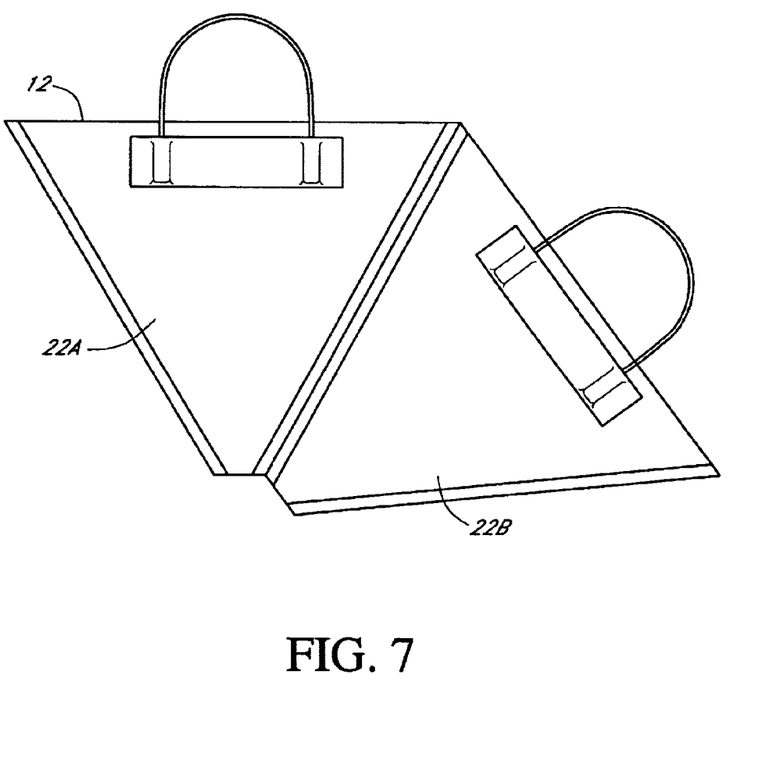
FIG. 7 is plan view of another embodiment of the bag sleeve of FIG. 1 illustrating the bag sleeve with an integral base portion.

FIG. 6 illustrates that in one embodiment, the base portion 20 is integral with the shield portion 12. Slits 56 are cut in the second end 16 of the shield portion 12 to form four fastening strips 58 which allow the opening 30 at the second end 16 to expand. In one embodiment, the slits 56 are approximately three inches in length and one inch apart, although other lengths and spacing can be used. The floral bouquet is held in the retaining space 26 at a desired height by the expansion or contraction of the fastening strips 58. The fastening strips 58 include two extended backbone seams 44 reaching downward and around a stem portion of the floral bouquet protruding from the opening 30. FIG. 7 illustrates another embodiment where the base portion 20 is integral with the shield portion 12.

Figure 8:
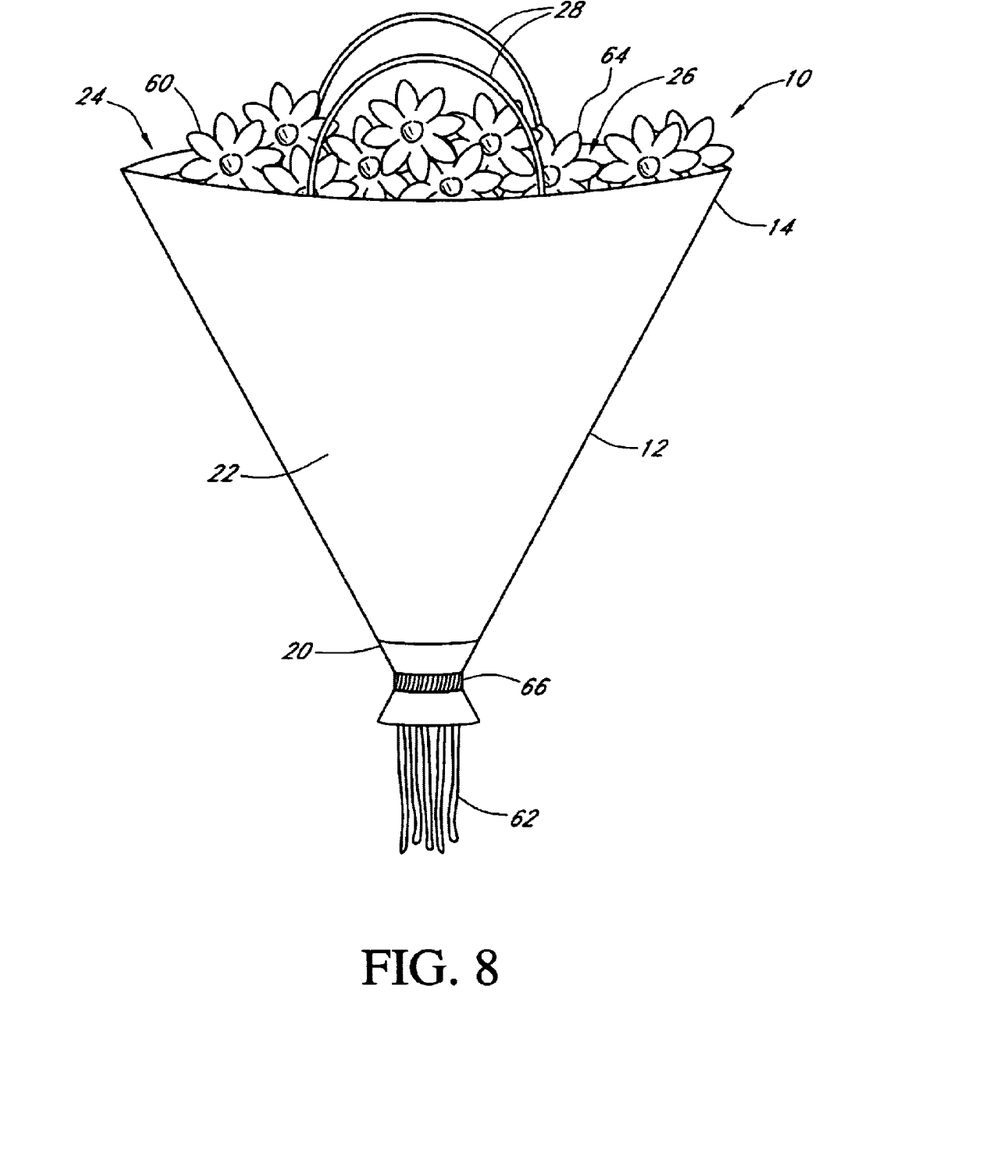
FIG. 8 is a perspective view of the bag sleeve of FIG. 1 with a floral group received therein.

In a general method of use, illustrated in FIG. 8, at least a portion of a floral bouquet 60 is disposed within the shield portion 12. In some applications, a stem portion 62 of the floral bouquet extends into the shield portion 12 via the opening 24, extending through the open second end 16 of the shield portion 12 and beyond the base portion 20. A bloom portion 64 of the floral bouquet 60 is therefore disposed near the opening 24 near the first end 14 of the shield portion 12 and the bloom portion 64 of the floral bouquet 60 is visible via the open first end 14 of the shield portion 12. In some instances, the bloom portion 64 of the floral bouquet 60 may extend above the open first end 14 of the shield portion 12. In some applications, the first end 14 of the shield portion 12 may be closed if desired (not shown).

In one method of use, an operator provides a bag sleeve 10 and a floral bouquet 60. The operator then disposes the floral bouquet 60 into the shield portion 12 by opening the shield portion 12 at the first end 14 and assuring both that the opening 24 therein is in an open condition, and that the side panels 22 of the shield portion 12 are somewhat expanded outwardly as well, the retaining space 26 is sized to receive the floral bouquet 60, as shown in FIG. 8. The operator then disposes the floral bouquet 60 into the bag sleeve 10 by inserting the stem portion 62 of the floral bouquet into the retaining space 26 and through the opening 30 in the base portion 20.

In one embodiment, a tying member 66 is wrapped around the base portion 20 to secure the stem portion 62 in place. In one embodiment, the tying member 66 is an elastic impregnated and water-resistant string that encompasses the circumference of the stem portion 62 and thereby presses and gathers the base portion 20 against itself and about the stem portion 62 of the floral bouquet 60. The tying member 66 can be an elastic string, rubber band, twist tie, ribbon or the like. The bag sleeve 10 can then be stored or displayed with other floral bouquets. The stem portion 62 can then be placed in a container of water (not shown) to help the bouquet remain fresh. Preferably, the base portion 20 extends the necessary length to secure the floral bouquet 60, but not necessarily into the water that is provided for transport and/or display. This keeps the shield portion 12 dry and protected away from the water in the container. When an operator desires to withdraw a bag sleeve 10 containing the floral bouquet 60, the operator must simply grasp the handles 28. Selecting the floral bouquet 60 using the handles 28 permits the operator's hands to remain free from water contained in a display container (not shown) and on the submerged stem portion 62 and away from any thorns on the stem portion 62.

When the floral bouquet 60 is disposed in the shield portion 12 by any method described herein, or known in the art, the shield portion 12 substantially surrounds and encompasses a substantial portion of the floral bouquet 60. When the shield portion 12 is disposed about the floral bouquet 60, the shield portion 12 forms a bag sleeve 10 which provides a protective packaging for the floral bouquet 60 contained therein while providing a convenient way to pick-up and carry the product. The defensive properties of the bag sleeve 10 protect the delicate characteristics of the floral bouquet 60 from surrounding forces experienced by the bouquet during, for example, packaging, handling, delivery and display. In addition, the bag sleeve 10 provides a natural floral display configuration that is pleasing and complementary to the flowers.

Specific blocks, sections, devices, functions and modules have been set forth. However, a skilled technologist will recognize that there are many ways to partition the system of the invention, and that there are many parts, components, modules or functions that may be substituted for those listed above. While the above detailed description has shown, described, and pointed out fundamental novel features of the invention as applied to various embodiments, it will be understood that various omissions and substitutions and changes in the form and details of the system illustrated may be made by those skilled in the art, without departing from the intent of the invention.

What is claimed is:

1. A bag sleeve for protecting a floral bouquet while transporting or carrying the floral bouquet, the bag sleeve comprising:

a shield portion defining a bouquet receiving space, wherein the shield portion has a blossom end and a stem end, and wherein the shield portion comprises first and second side panels attached to one another along their lateral edges to form two diametrically opposed v-grip backbones; wherein the v-grip backbones are configured to permit the first and second side panels to bow outwardly from the v-grip backbones thereby expanding the bouquet receiving space; and wherein each of the v-grip backbones comprises overlapped portions of the side edges of the first and second panels bonded together, and a crease that runs from the blossom end to the stem end, the bonded portions and the creases providing a bias against the expansion of the bouquet receiving space, resulting in a snug fit of the bouquet in the bag sleeve.

2. The bag sleeve of claim 1, wherein at least one of the panels comprises at least two layers, wherein at least one of the layers is made of a material that is dissimilar to the material of the other layers.

3. The bag sleeve of claim 2, wherein one of the layers comprises a paper layer.

4. The bag sleeve of claim 3, wherein the paper layer is made of a rigid paper material.

5. The bag sleeve of claim 3, wherein one of the layers comprises a water-resistant layer.

6. The bag sleeve of claim 5, wherein the water-resistant layer is polypropylene.

7. The bag sleeve of claim 1, further comprising a water-resistant base portion extending from the stem end of the shield, the base portion comprising an opening that permits stems of the floral bouquet to protrude from the bag sleeve, and wherein the base portion is a transparent plastic.

8. The bag sleeve of claim 7, wherein the base portion is made of polypropylene.

9. The bag sleeve of claim 7, wherein the base portion is attached to the shield portion with tape.

10. The bag sleeve of claim 1, further comprising at least one handle attached to the blossom end of the shield portion and wherein the at least one handle projects away from the receiving space in the shield portion.

11. The bag sleeve of claim 10 having two handles.

12. The bag sleeve of claim 11, wherein the handles are attached to the shield portion with bonding strips.

13. The bag sleeve of claim 1, wherein the side panels have an inverted triangular shape with a truncated tip.

14. The bag sleeve of claim 1, wherein each of the v-grip backbones is configured to form a three-ply seam.

15. The bag sleeve of claim 1, wherein each of the v-grip backbones is configured to form a six-ply seam.

16. A bag sleeve for protecting a floral bouquet while transporting or carrying the floral bouquet, the bag sleeve comprising:

a shield portion defining a bouquet receiving space, wherein the shield portion has a blossom end and a stem end, wherein the shield portion has a first opening in the blossom end and a second opening in the stem end, wherein the second opening in the stem end is configured to permit stems from the floral bouquet to protrude from the bag sleeve; and wherein the shield portion comprises:
a first side panel having top, bottom, and side edges;
a second side panel having top, bottom and side edges;
wherein the first and second side panels are attached to one another along their sides edges thereby forming v-grip backbones in the bag sleeve; and
wherein each of the v-grip backbones comprises overlapped portions of the side edges of the first and second panels bonded together, and a crease that runs from the blossom end to the stem end, the bonded portions and the creases providing a bias against the expansion of the bouquet receiving space, resulting in a snug fit of the bouquet in the bag sleeve.

17. The bag sleeve of claim 16, further comprising a water-resistant base portion extending from the stem end of the shield portion, wherein the base portion has an opening therein configured to permit stems of the floral bouquet to protrude from the bag sleeve.

18. The bag sleeve of claim 17, wherein the base portion is made of polypropylene.

19. The bag sleeve of claim 16, further comprising a plurality of slits in the stem end of the shield portion, wherein the slits are configured to run vertically along a portion of the bag sleeve to allow for expansion of the size of the opening in the stem end of the shield portion.

20. The bag sleeve of claim 16, wherein at least one of the side panels comprises a rigid paper layer and a water-resistant layer bonded to said paper layer.

21. The bag sleeve of claim 16, further comprising at least one handle attached to the blossom end of the shield portion, and wherein the at least one handle projects away from the receiving space in the shield portion.

22. The bag sleeve of claim 21 having two handles.

23. The bag sleeve of claim 16, wherein the side panels have an inverted triangular shape with a truncated tip.

24. A method of displaying a floral bouquet in a protective bag sleeve, the method comprising:

inserting a floral bouquet into a bag sleeve having an upper blossom portion and a lower stem portion, such that at least one stem of the floral bouquet protrudes from a water-resistant base portion in the stem portion of the bag sleeve, and wherein the bag sleeve comprises first and second side panels attached to one another along their lateral edges to form two diametrically opposed v-grip backbones, each of the v-grip backbones comprising:
overlapped portions of the side edges of the first and second panels, the overlapped portions bonded together; and
a crease that runs from the blossom end to the stem end;
wherein the bonded portions and the creases provide a bias against the expansion of the bouquet receiving space resulting in a snug fit of the bouquet in the bag sleeve;

securing the floral bouquet in the bag sleeve by wrapping a member around the water-resistant base portion with the stem protruding therefrom; and displaying handles attached to the bag sleeve such that the handles extend above the upper blossom portion of the bag sleeve.

25. The method of displaying a floral bouquet of claim 24, wherein a portion of the bag sleeve is made of a rigid paper material.

26. A method of carrying a floral bouquet in a protective bag sleeve, the method comprising:

inserting a floral bouquet into a bag sleeve having an upper blossom portion and a lower stem portion, such that at least one stem of the floral bouquet protrudes from a water-resistant base portion in the stem portion of the bag shield, and wherein said shield portion comprises first and second side panels attached to one another along their lateral edges to form two diametrically opposed v-grip backbones, each of the v-grip backbones comprising:
overlapped portions of the side edges of the first and second panels, the overlapped portions bonded together; and a crease that runs from the blossom end to the stem end;
wherein the bonded portions and the creases provide a bias against the expansion of the bouquet receiving space, resulting in a snug fit of the bouquet in the bag sleeve;

securing the floral bouquet in the bag sleeve by wrapping a member around the water-resistant base portion with the stem protruding therefrom; and carrying the bag sleeve with handles attached to the blossom portion such that the handles extend above the upper blossom portion of the bag sleeve.

27. The method of displaying a floral bouquet of claim 26, wherein a portion of the bag sleeve is made of a rigid paper material.

28. A bag sleeve for protecting a floral bouquet while transporting or carrying the floral bouquet, said bag sleeve comprising:
a shield portion defining a bouquet receiving space, wherein said shield portion has a blossom end and a stem end, and wherein said shield portion comprises first and second side panels attached to one another along their lateral edges to form two diametrically opposed v-grip backbones, each of the v-grip backbones comprising:
overlapped portions of the side edges of the first and second panels, the overlapped portions bonded together; and
a crease that runs from the blossom end to the stem end;
wherein the bonded portions and the creases provide a bias against the expansion of the bouquet receiving space, resulting in a snug fit of the bouquet in the bag sleeve;
means for carrying said bag sleeve; and
means for allowing stems of the floral bouquet to protrude from the stem end of the shield portion.

29. The bag sleeve of claim 27, wherein the means for allowing stems to protrude from the bag sleeve comprises a water-resistant base portion extending from the stem end of the shield portion, wherein the base portion has an opening therein permitting stems of the floral bouquet to protrude from the bag sleeve.

30. The bag sleeve of claim 29, wherein the base portion is made of polypropylene.

31. The bag sleeve of claim 28, wherein at least one of the panels comprises a rigid paper layer and a water-resistant layer attached to said paper layer.

32. The bag sleeve of claim 28, wherein the means for carrying comprises at least one handle attached near the blossom end and projecting away from the receiving space in the shield portion.

33. A sleeve for a floral bouquet, the sleeve comprising:
a first side panel having top, bottom, and side edges;
a second side panel having top, bottom, and side edges, the second side panel substantially similar in shape to the first side panel; and
wherein the first and second side panels are configured to form a space for receiving the bouquet, wherein the top ends of the side panels are configured to form an opening for displaying a blossom end of the bouquet, wherein the bottom ends of the side panels are configured to form an opening that permits a stem end of the bouquet to protrude from the sleeve, and wherein the first and second panels are attached to each other along their side edges to form v-grip backbones, each of the v-grip backbones comprising:
overlapped portions of the side edges of the first and second panels, the overlapped portions bonded together; and
a crease that runs from the blossom end to the stem end;
wherein the bonded portions and the creases provide a bias against the expansion of the bouquet receiving space, resulting in a snug fit of the bouquet in the bag sleeve.

34. The sleeve of claim 33, wherein the v-grip backbones are configured to be substantially diametrically opposed to one another.

35. The sleeve of claim 34, wherein the v-grip backbones are configured to permit the first and second side panels to rest flat and adjacent to one another when the sleeve is not in use.

36. The sleeve of claim 34, wherein the v-grip backbones are configured to permit the first and second side panels to bow outwardly from the v-grip backbones thereby expanding the space for receiving the bouquet.

37. The sleeve of claim 34, wherein the v-grip backbones are configured to form a three-ply crease.

38. The sleeve of claim 34, wherein a side panel comprises at least two layers, wherein one of the layers is made of a material dissimilar to the material of the other layers.

39. The sleeve of claim 38, wherein one layer defining an internal surface of the space for receiving the bouquet is made of a water resistant material, and wherein one layer defining an exterior surface of the sleeve is made of a paper material.

40. The sleeve of claim 39, wherein the water resistant material is polypropylene and the paper material is a natural craft paper, the craft paper comprising a paper weight of about 120 to 150 grams.

41. The sleeve of claim 33, further comprising a plurality of slits in the bottom ends of the side panels, wherein the slits are configured to run vertically along a portion of the sleeve to allow for expansion of the size of the opening that permits the stem end of the bouquet to protrude from the sleeve.

42. A method of manufacturing a sleeve for a floral if bouquet, the method comprising:
providing a shield that defines a blossom end, a stem end, and a space for receiving the bouquet, wherein providing a shield comprises providing:
a first side panel having top, bottom, and side edges;
a second side panel having top, bottom, and side edges, the second side panel substantially similar in shape to the first side panel;
wherein the top ends of the side panels are configured to form an opening for displaying a blossom end of the bouquet; and
wherein the bottoms ends of the side panels are configured to form an opening that permits a stem end of the bouquet to protrude from the sleeve; and
forming in the shield at least one v-grip backbone running substantially from the blossom end to the stem end, the v-grip backbone comprising:
overlapped portions of the side edges of the first and second panels bonded together; and
a crease that runs substantially from the blossom end to the stem end;
wherein the bonded portions and the crease provide a bias against the expansion of the bouquet receiving space, resulting in a snug fit of the bouquet in the bag sleeve.

43. The method of claim 42, wherein providing a shield comprises providing two side panels,that are substantially similar in shape, wherein the side panels face one another and are attached to each other along side edges of the panels so as to define an interior space between the side panels, and wherein the interior space between the panels is the space for receiving the bouquet.

44. The method of claim 43, wherein forming at least one v-grip backbone comprises attaching the side panels along side edges of the panels to form multi-ply seams.

45. The method of claim 42, wherein forming at least one v-grip backbone comprises making the shield of a resilient material.

46. The method of claim 45, wherein making the shield of a resilient material comprises making the shield of a material that provides a bias against expansion of the space for receiving the bouquet.

47. The method of claim 46, wherein making the shield of a resilient material comprises making the shield of a material that permits the shield to adopt a flat configuration when not in use to receive the floral bouquet.

48. The method of claim 47, wherein making the shield of a resilient material comprises making the shield of a material comprising a laminate of a paper material and a water resistant material.

49. The method of claim 48, wherein making the shield of a material comprising a laminate comprises making the shield of a natural craft paper, having a weight of about 120 to 150 grams and bonded to a layer of propylene.

50. The method of claim 48, further comprising configuring the shield so that the water resistant material defines at least a portion of an internal surface of the sleeve, and the paper material defines at least a portion of an external surface of the sleeve.

51. The method of claim 42, wherein forming in the shield at least one v-grip backbone comprises attaching each the panels along two of their edges to form dual, diametrically opposed v-grip backbones.

52. The method of claim 51, wherein forming in the shield at least one v-grip backbone comprises configuring the v-grip backbones to permit the first and second side panels to bow outwardly from the v-grip backbones thereby expanding the space for receiving the bouquet.

53. The method of claim 52, wherein forming in the shield at least one v-grip backbone comprises configuring the v-grip backbones to permit the first and second side panels to rest substantially flat and adjacent to one another when the sleeve is not in use for receiving the bouquet.

54. The sleeve of claim 52, wherein a side panel comprises at least two layers, wherein one of the two layer is adjacent to the space for receiving the bouquet and is made of a water resistant material, and wherein one layer defining an exterior surface of the sleeve is made of a paper material.

55. The method of claim 42, wherein providing a shield further comprises providing side panels having a triangular shape with a truncated tip.

* * * * *